United States Patent [19]

Armas et al.

[11] 4,254,761
[45] Mar. 10, 1981

[54] COMBINATION LIGHTER

[76] Inventors: Russell G. Armas, 2536 Belhaven Way, Sacramento, Calif. 95826; Patrick A. McGowan, 221 Village Cir., Sacramento, Calif. 95838

[21] Appl. No.: 869,045

[22] Filed: Jan. 13, 1978

[51] Int. Cl.³ .............................................. F24J 3/02
[52] U.S. Cl. .................................................. 126/451
[58] Field of Search ........................ 126/270; 350/294

[56] References Cited
U.S. PATENT DOCUMENTS 4,076,014  2/1978  Wiquel ................................. 126/270

FOREIGN PATENT DOCUMENTS 2309808  5/1975  France ..................................... 126/270

Primary Examiner—Samuel Scott
Assistant Examiner—Wesley S. Ratliff, Jr.
Attorney, Agent, or Firm—Edward J. DaRin

[57] ABSTRACT

A combination lighter constructed of a conventional, flame producing lighter integrated with a solar lighting device as a single unit or lighter. The solar lighter may include a tubular structure having a solar lens for focusing the solar rays onto an object to be lit that is positioned within the tubular structure. The tubular structure may include an aperture for viewing the position of the object so as to permit positioning it at the focal point of the lens and for ventilation purposes.

10 Claims, 5 Drawing Figures

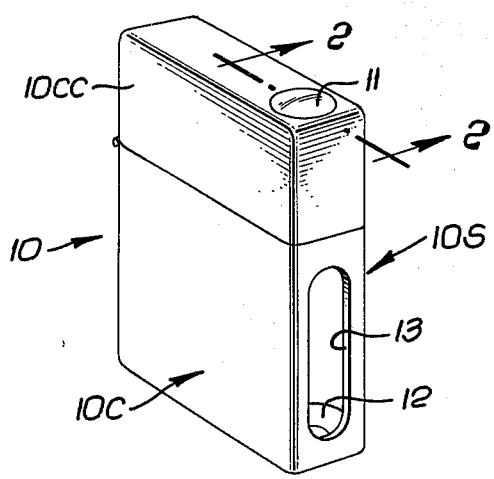
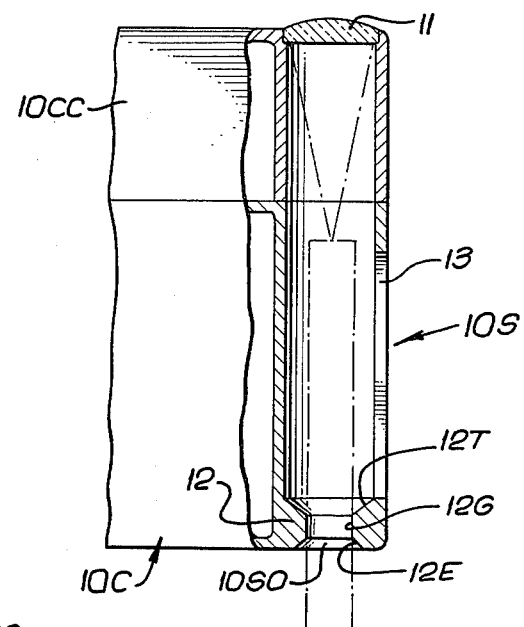
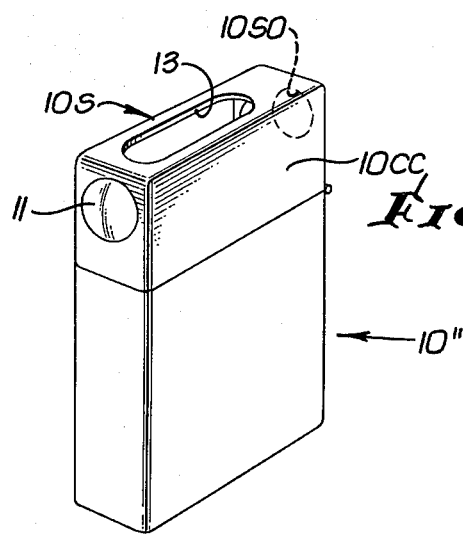
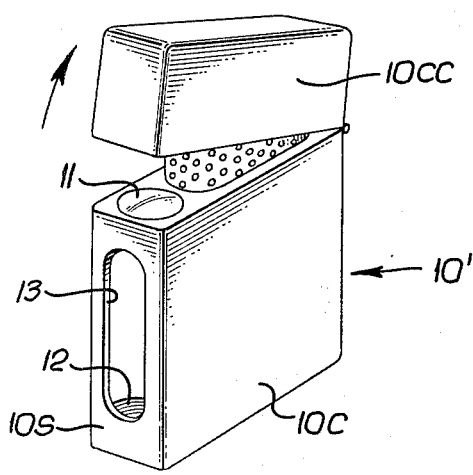
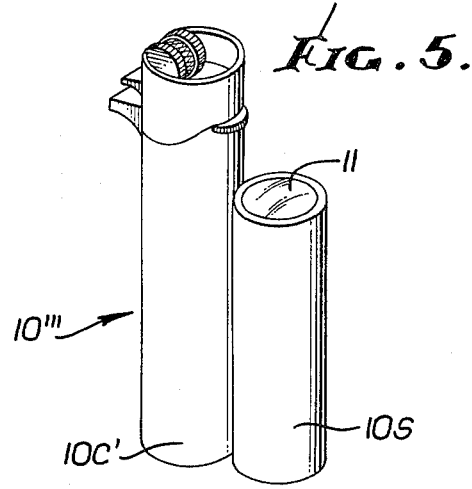

COMBINATION LIGHTER

PRIOR ART AND SUMMARY OF THE INVENTION

This invention relates to a solar lighter and more particularly to a combination lighter having a conventional lighter integrated with a solar lighter in one unit.

At the present time, solar energy is being widely explored and promoted as a substitute for other energy sources. Various practical applications for solar energy have been developed. These applications of solar energy are attractive in that they appear to be relatively inexpensive energy sources. Prior to the energy "crunch", solar applications were being explored. Solar applications of the prior art include solar lighting devices. To this end, solar lighters for igniting objects without lighters are found in Australian Pat. Nos. 236,083 and 238,019 and French Pat. No. 1,460,899. These prior art patents disclose solar lighters for lighting cigarettes while Australian Pat. No. 239,685 discloses a solar pipe lighter. Solar lighters have also been incorporated with other articles as a convenient mounting means for a lens to focus solar rays. Solar rays have been mounted in cigarette cases such as disclosed in U.S. Pat. No. 2,604,982, German Pat. No. 560,633 and Italian Pat. No. 441148. A mounting structure in the form of a match cover is disclosed in French Pat. No. 387,917 for lighting cigarettes or matches. Solar energy, of course, is available only during daylight hours and in areas where sunlight is available. Solar energy for lighting objects such as cigarettes, cigars, or the like, cannot be used at night or in environments where sunlight is restricted. Despite the aforementioned prior art developments, there are no devices to our knowledge available for combining or using solar energy for lighting devices in combination with a conventional flame producing device.

The present invention provides an improved, versatile combination lighter having a conventional lighter constructed with a solar lighter to provide all of the advantages of a solar lighter and yet permit objects to be lighted with the same device in environments where solar lighters cannot be used. Lighters are personal devices carried by an individual for lighting cigarettes, cigars, etc. The life of the fuel required for a conventional lighter can be extended by combining it with a solar lighter since the solar lighter does not burn fuel and can be used to light objects without using the fuel in the lighter. The conventional lighter need only be employed when solar energy is not available. The combination lighter can be conveniently and inexpensively incorporated into present day lighters of all types. Such a combination lighter avoids the problem of carrying two lighters, one an exclusive solar lighter and the other a conventional lighter by incorporating the advantages of both types of lighters into a simple structural organization. The combination lighter is not only practical but is also fun to use and may be employed as a means for promoting solar energy applications.

From a broad structural standpoint, the present invention comprehends a combination lighter comprising a conventional lighter for cigarettes, cigars and the like and solar lighting means constructed integrally with the lighter so that the two can be selectively and alternately used.

From a specific standpoint, the combination lighter of the present invention comprehends the solar lighting means constructed integrally with the conventional lighter wherein a tubular structure is constructed integrally with the conventional lighter and having a solar lens mounted to one end for closing off the tubular structure and defined for permitting objects to be lighted to be slidably received at the open end of the tubular structure for positioning an object at the focal point of the solar lens to be lighted solely by means of solar rays focused to impinge thereon. The structure may include a ventilation aperture defined intermediate the ends thereof for permitting the object to be lit to be positioned at the focal point of the solar lens.

These and other features of the present invention may be more fully appreciated when considered in the light of the following specification and drawings, in which:

FIG. 1 is a perspective view of the combination lighter embodying the present invention;

FIG. 2 is an enlarged, sectional view taken along the line 2—2 of FIG. 1;

FIG. 3 is a perspective view of an alternate embodiment of the combination lighter illustrated in FIGS. 1 and 2;

FIG. 4 is a perspective view of another embodiment of the invention wherein the solar lighter is integrated wholly within the cover of a conventional lighter; and FIG. 5 is a perspective view of yet another embodiment of a combination lighter.

Now referring to the drawings, the combination lighter 10 of the present invention will be examined in detail. It should be noted at the outset that the concept of this invention resides in integrating a solar lighter with any type of conventional lighter without reference to the type of fuel used in the lighter, means for producing a flame and the shape of the conventional lighter. The term solar lighter as employed in this specification and claims refers to any means for focusing the sun's rays that may be readily integrated with a conventional lighter so as to permit the focused rays to ignite an object such as a cigarette, cigar, or the like. The preferred embodiment of the solar lighter comprises a tubular structure mounting a solar lens on one end for permitting an object positioned in the tubular structure through the opposite end to be ignited as will be described more fully hereinafter. It will be understood that the conventional lighter and the solar lighter integrated into the combination lighter 10 of the present invention may be alternately employed in accordance with the environmental conditions under which the lighter is to be used. Stated differently, in environments wherein the solar lighter may not be employed, the conventional lighter is readily available for use and vice versa. In addition, when a lighter is required the combination lighter 10 of the present invention allows an object to be ignited by means of solar energy without depleting the supply of fuel associated with the conventional lighter and thereby rendering it useful for longer periods of time without refueling, repairs, etc.

Now referring specifically to FIGS. 1 and 2, the combination lighter 10 of the present invention will be described in detail. The portion of the combination lighter 10 which comprises the conventional lighter is illustrated in FIG. 1 as a conventional lighter which may burn butane or have a replaceable wick which is saturated with a fuel and is ignited for producing a flame to light an object. This portion of the conventional lighter is identified in FIGS. 1 and 2 by the reference numeral 10C. The solar lighter integrated with the conventional lighter 10C is identified by the reference numeral 10S. The lighter 10C has a swingable cover 10CC overlying the lighter body as illustrated. The cover 10CC is swingable about the back end for exposing the lighting structure when it is to be used. In FIGS. 1 and 2, the solar lighter 10S is illustrated as a tubular structure constructed integrally with the conventional lighter by means of the cover 10CC and the body 10C of the conventional lighter. To this end, a solar lens 11 is secured to the top side of the cover 10CC for the combination lighter 10 at the right-hand end thereof as illustrated. The solar lens 11 may be constructed of any conventional material including plastic for focusing the solar rays. The remaining portion of the solar lighter 10S is constructed and defined as a tubular structure adjacent the body portion 10C of the conventional lighter in a juxtaposed position thereto and in alignment with a tubular portion constructed integrally with the cover 10CC as best viewed in FIG. 2. The open end 10SO of the tubular structure opposite the end mounting the solar lens 11 is constructed and defined as including a guiding structure for readily guiding the entry of a cigarette or the like into the tubular structure to be ignited. The guiding structure 12 as illustrated in FIG. 2 has a tapered entry 12E for readily receiving and guiding the object into the tubular structure and a portion defined to be of a diameter slightly larger than the diameter of a cigarette so as to be readily guided and positioned into the internal structure of the tubular structure for the solar lighter 10S. This latter-mentioned portion of the guiding structure 12 is identified as 12G. The interior end of the portion 12G is tapered outwardly to the interior walls of the tubular structure and this tapered portion is identified by the reference numeral 12T. The guiding structure 12 may be eliminated from the solar lighter if the solar lighter is to be used for lighting objects larger than cigarettes such as cigars.

The solar lighter 10S also includes an aperture 13 arranged intermediate the ends of the tubular structure on one side thereof for providing ventilation for the object held within the tubular structure. The aperture 13 also functions to permit viewing the end of the object to be lit so that it may be correctly positioned relative to the focal point of the solar rays. To this end, a cigarette is illustrated in dotted outline in FIG. 2 positioned within the guiding structure 12 and having its inner end placed at the focal point of the solar rays impinging thereon through the solar lens 11 for ignition purposes. With this disclosed combination for the lighter 10 and with solar energy available, a cigarette or similar object can be ignited without the expenditure of fuel and without removing the cover 10CC in a matter of seconds.

Now referring to FIG. 3, an alternate embodiment of the combination lighter 10' is illustrated wherein the solar lighter 10S is integrated wholly within the body section 10C of the conventional lighter. The lighter 10 is illustrated with the cover 10CC partially open for exposing the conventional lighting structure. To this end, the solar lens 11 is mounted adjacent the conventional lighter rather than in the cover 10CC. The remaining portion, or the tubular structure of the solar lighter 10S is integrated into the conventional lighter 10C and is of the same construction as shown in FIGS. 1 and 2 and is similarly used. In this embodiment, the cover 10CC must be swung to an open position to expose the solar lens 11 to the solar rays.

Now referring to FIG. 4, another embodiment of the combination lighter 10" is illustrated wherein the solar lighter 10S is constructed and defined solely within the cover 10CC for the conventional lighter 10C. To this end, the solar lens 11 is mounted to one end of the cover 10CC and the open end 10SO of the tubular structure is defined in the opposite end of the cover as illustrated. The aperture 13 for the solar lighter 10S is defined in the top side of the cover 10CC.

It will be understood by those skilled in the art that in the embodiments of the solar lighter 10S that are integrated into the cover 10CC that the solar lens 11 may comprise the solar lighter 10S by mounting the solar lens 11 solely within the cover such as illustrated in FIG. 1 without the remaining portions of the solar lighting structure. To this end, in the event that the solar lighter 10S is to be defined by mounting the solar lens 11 in the cover in a position as illustrated in FIG. 1, the remaining portion of the solar lighting structure may be eliminated. When a solar lighter 10S is defined in this fashion, it may be utilized by opening the cover, positioning the solar lens 11 relative to the solar rays for focusing on an object positioned between the inside of the cover 10CC and the body of the conventional lighter at the focal point of the solar lens 11.

FIG. 5 illustrates the embodiment 10''' of the combination lighter wherein a solar lighter 10S is integral with a conventional lighter 10C' constructed in the form of a tubular structure and known as a conventional "Cricket" lighter. In this embodiment, the solar structure 10S, similar to that illustrated in FIG. 2, may be provided and integrated into the structure 10C' by incorporating the solar lighter 10S in a parallel, juxtaposed arrangement with the conventional lighter 10C. In this embodiment, the guide means may be employed or omitted in accordance with the use of the conventional lighter 10C'.

From the above description it should be appreciated by those skilled in the art that the present invention has advanced the state of the art through the disclosure of a combination lighter 10 wherein conventional lighting means is integrated with solar lighting means to provide the advantages of both types of lighters in one unitary structure. The incorporation of the solar lighter within the conventional structure may be readily accomplished with a minimum of expense wherein the life of the fuel and mechanical elements of the conventional lighter is extended. The use of the solar lighter permits objects to be lighted without a flame, associated parts, expending fuel, etc.

What is claimed is:

1. A combination of a conventional lighter and a solar lighter for lighting objects such as cigarettes, cigars and the like, comprising conventional lighter means for lighting objects such as cigarettes, cigars and the like, said conventional lighter means comprising main body means including means for producing a flame to permit an object to be lighted from the flame that is produced by conventional means within the main body by the burning of a fuel, and solar lighting means being defined in a juxtaposed position integrally with the main body of the conventional lighter for lighting an object, said lighting means including a lens for focusing the solar rays on the object, to be lit.

2. A lighter combination as defined in claim 1 wherein said solar lighting means includes an object receiving structure mounting the solar lens adjacent one end and an object receiving aperture adjacent the opposite end for receiving an object to be lit and positioning it adjacent the solar lens to be lit by the solar rays focused thereon.

3. A combination lighter as defined in claim 1 wherein said solar lighting means comprises a tubular structure constructed integrally with the lighter and having a solar lens mounted to one end thereof for closing off the tubular structure and defined for permitting objects to be lighted to be slidably received in the tubular structure for positioning an object to be lit at the focal point of the solar lens to be lighted solely by the solar rays impinging thereon, said tubular structure including a single oblong ventilation aperture defined intermediate the ends thereof.

4. A combination lighter as defined in claim 3 including guide means defined adjacent the open end of the tubular structure for guiding the entry of an object to be lit, such as a cigarette, into the tubular structure.

5. A combination lighter as defined in claim 1 wherein including cover means having a solar lens mounted thereto.

6. A combination lighter as defined in claim 1 wherein said solar lighting means comprises a tubular passageway defined longitudinally of the main body of the lighter with a solar lens mounted adjacent to one end of the tubular passageway.

7. A combination lighter as defined in claim 6 wherein said tubular means includes guide means adjacent the end opposite the end mounting the solar lens for guiding objects to be lighted inserted into the tubular passageway.

8. A combination lighter as defined in claim 6 wherein said tubular passageway includes an aperture spaced adjacent the lens for permitting the end of the object to be lighted to be ventilated therethrough.

9. A combination lighter as defined in claim 1 including cover means constructed and defined with a tubular opening extending therethrough with a solar lens mounted thereto for closing an end of said opening and permitting an object to be lighted to be inserted into said opening to be lit from the solar rays focused thereon by means of the solar lens.

10. A combination lighter as defined in claim 9 wherein said tubular opening includes means for guiding an object to be lighted defined adjacent the end opposite the end mounting the lens and having ventilation means defined intermediate the ends of the tubular opening.

* * * * *